United States Patent [19]

Arnberg

[11] 4,047,517

[45] Sept. 13, 1977

[54] METHOD AND APPARATUS FOR RECEIVING SOLAR ENERGY

[76] Inventor: B. Thomas Arnberg, 2885 Kenyon Circle, Boulder, Colo. 80303

[21] Appl. No.: 702,640

[22] Filed: July 6, 1976

[51] Int. Cl.² .............................................. F24J 3/02
[52] U.S. Cl. .................................. 126/270; 126/271; 350/288
[58] Field of Search ............... 126/270, 271; 237/1 A; 60/641; 350/288, 293, 299

[56] References Cited

U.S. PATENT DOCUMENTS

| | | | |
|---|---|---|---|
| 3,466,119 | 9/1969 | Francia | 126/270 |
| 3,884,217 | 5/1975 | Wartes | 126/271 |
| 3,905,352 | 9/1975 | Jahn | 126/271 |
| 3,923,381 | 12/1975 | Winston | 126/271 X |
| 3,924,604 | 12/1975 | Anderson | 126/271 |
| 3,951,129 | 4/1976 | Brantly, Jr. | 126/271 |
| 3,979,597 | 9/1976 | Drucker | 126/270 |

*Primary Examiner*—Kenneth W. Sprague

*Attorney, Agent, or Firm*—O'Rourke, Harris & Hill

[57] ABSTRACT

A method and apparatus for receiving solar energy reflected from a heliostat configuration in which the apparatus is formed of converging vanes defining cavities therebetween, and preferably converging towards a cavity. The vanes may partially or completely define an enclosed volume. Surfaces of the vanes are provided with reflective surfaces near the outer portions of the receiver, selective surfaces at the intermediate portions and, optionally, absorbing surfaces at the interior portions. Cooling means are provided within the vanes of the receiver adjacent the selective and absorbing surfaces. In a preferred embodiment, a transparent barrier is provided transverse to the vanes substantially at the change from the reflective to the selective surfaces, and an infrared absorbing heat transfer fluid is flowed inwardly from the transparent barrier to the cavity to cool the receiver and absorb energy irradiated from the vanes and cavity.

18 Claims, 5 Drawing Figures

METHOD AND APPARATUS FOR RECEIVING SOLAR ENERGY

BACKGROUND OF THE INVENTION

1. Field of the Invention

The present invention relates generally to a method and apparatus for receiving solar energy, and more particularly to a method and macro receiver for absorbing large amounts of radiant energy provided by heliostats, the method and apparatus particularly providing a large target area with low irradiation losses from the receiver.

2. Description of the Prior Art

Heliostats have been known since ancient times. Basically, heliostats constitute a plurality of reflective surfaces which track the sun and concentrate the reflected energy into a limited area. However, because of the finite image of the sun provided by the heliostats, and because of the errors both in tracking and in the optical surface of the heliostat, a relatively large receiver for the reflective solar energy is desirable. Since heliostats may be arrayed for many miles from the receiver, tremendous amounts of energy are focused upon the receiver thus generating high temperatures. As a result, and particularly since irradiation is a function of the fourth power of the absolute temperature of the receiver, a large receiver which accommodates the tracking and focusing errors of the heliostats and operates at high temperatures soon compromises the efficiency of the system as a result of irradiation losses from the receiver.

This is a long standing problem as illustrated by the Calver U.S. Pat. No. 294,117. More recently, Falbel U.S. Pat. No. 3,841,302; Cummings U.S. Pat. No. 3,869,199; and Levi-Setti U.S. Pat. No. 3,899,672 illustrate a continuing interest in the problem of concentrating solar energy.

SUMMARY OF THE INVENTION

The present invention, which provides a heretofore unavailable improvement over previous methods for solar energy receiving and apparatus for receiving solar energy, comprises an apparatus formed substantially of a series of diverging vanes forming either partially or completely, an absorbing cavity and terminating in a series of exterior defined openings providing a large target for receiving solar energy. The portions of the vanes immediatly adjacent the interior ends of the vanes may be solar energy absorbing, i.e., display black body characteristics, the intermediate portions and interior portions of the vanes not absorbing are provided with a selective coating surface, and the outer portions of the vanes are provided with a reflective surface. In a particularly preferred embodiment, a barrier substantially transparent in the solar spectrum is provided substantially at the interface between the reflective and selective surfaces of the vane to enclose the inner volumes defined by the vanes. A working fluid is flowed through the enclosed volume to assist in cooling the vanes and also to absorb irradiation, and particularly infrared radiation, emitted by the cavity walls and/or vanes.

Accordingly, an object of the present invention is to provide a new and improved method and apparatus for receiving macro amounts of concentrated solar energy.

Another object of the present invention is to provide a new and improved method and apparatus for providing a larger target for receiving concentrated solar energy.

Yet another object of the present invention is to provide a new and improved method and apparatus for minimizing irradiation losses from a solar receiver having a large target area.

Still another object of the present invention is to provide a new and improved method and apparatus for receiving solar energy in which specific areas of the vanes guiding solar energy to an absorption cavity are coated with reflective, selective or absorbing surfaces.

Yet another object of the present invention is to provide a new and improved method and apparatus for receiving solar energy in which a radiation absorbing working fluid is flowed between portions of the vanes to absorb radiation irradiated by the portions of the receiver at elevated temperatures.

These and other objects and features of the present invention will become apparent from the following description.

DETAILED DESCRIPTION OF THE INVENTION

Figures 1, 2:
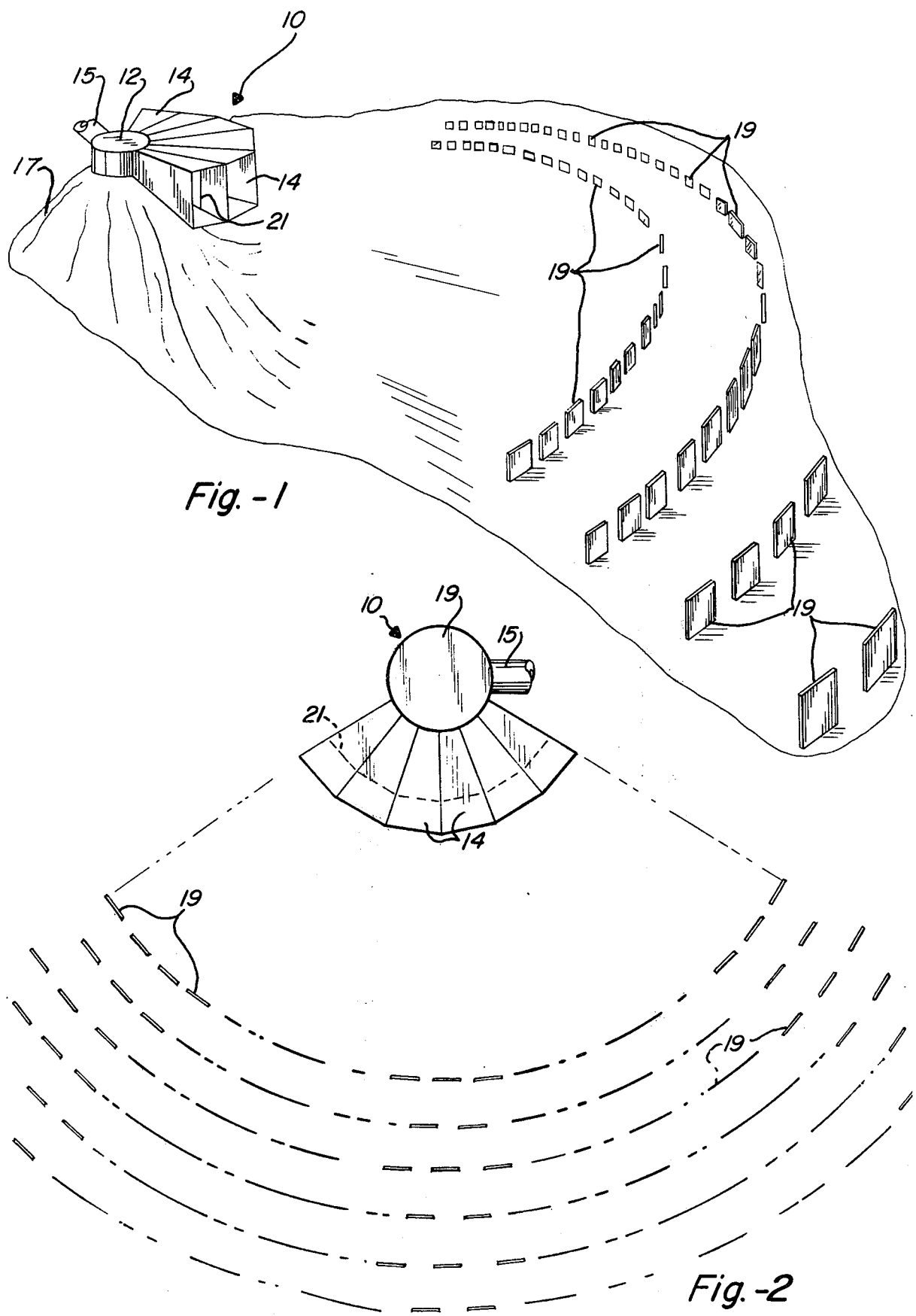
FIG. 1 is a perspective view of a typical solar energy receiver in accordance with the instant invention disposed relative to a typical array of heliostats.
FIG. 2 is a simplified top view of the arrangement of FIG. 1.

Turning now to the drawings, wherein like components are designated by like reference numerals throughout the various figures, an apparatus for receiving solar energy is illustrated in FIGS. 1 and 2 and generally designated by reference numeral 10. As will be described in more detail hereinafter, receiver 10 is formed by walls defining partially enclosed optional cavity 12 with a number of vanes 14 opening into and converging towards cavity 12. Of course in some instances the volume defined by the walls of vanes 14 can serve the function of distinct cavity 12. Though the discussion will be directed to the preferred embodiment including cavity 12, it is to be understood that cavity 12 is optional. Outlet 15 communicates with cavity 12 and is adapted to convey a media transmitting absorbed energy to appropriate utilization means (not shown), or conveying a process stream from receiver 10. While the nature of such utilization is beyond the scope of this invention, conventional uses include direct use as a working fluid in generation of electricity, process heat, or super heated steam for heating large installations, driving turbines, in situ reformation such as steam reformation of organic compound, etc.

Receiver 10 is positioned at the apex of a natural mound such as mountain 17. Thus, heliostats 19, arrayed below receiver 10, are individually directed to reflect solar energy into the openings defined by vanes 14. Alternatively, heliostats 19 may be, as is conventionally understood, arrayed on the walls of a bowl-shaped topography with receiver 10 positioned below heliostats 19. In any event, it is necessary that receiver 10 be vertically spaced relative to heliostats 19 in order that one row of heliostats 19 not shade an adjacent row of heliostats 19, or block the reflected energy therefrom.

Heliostats 19 are well known and do not constitute a critical aspect of the invention. Basically, heliostats 19 are tracking devices, preferably in the form of movable, slightly concave mirrors which move with the sun to reflect the energy from the sun from heliostats 19 into the openings defined by vanes 14.

In a particularly preferred embodiment of the invention, receiver 10 includes transparent barrier 21 which serves functions which will be more fully described below.

Figure 3:
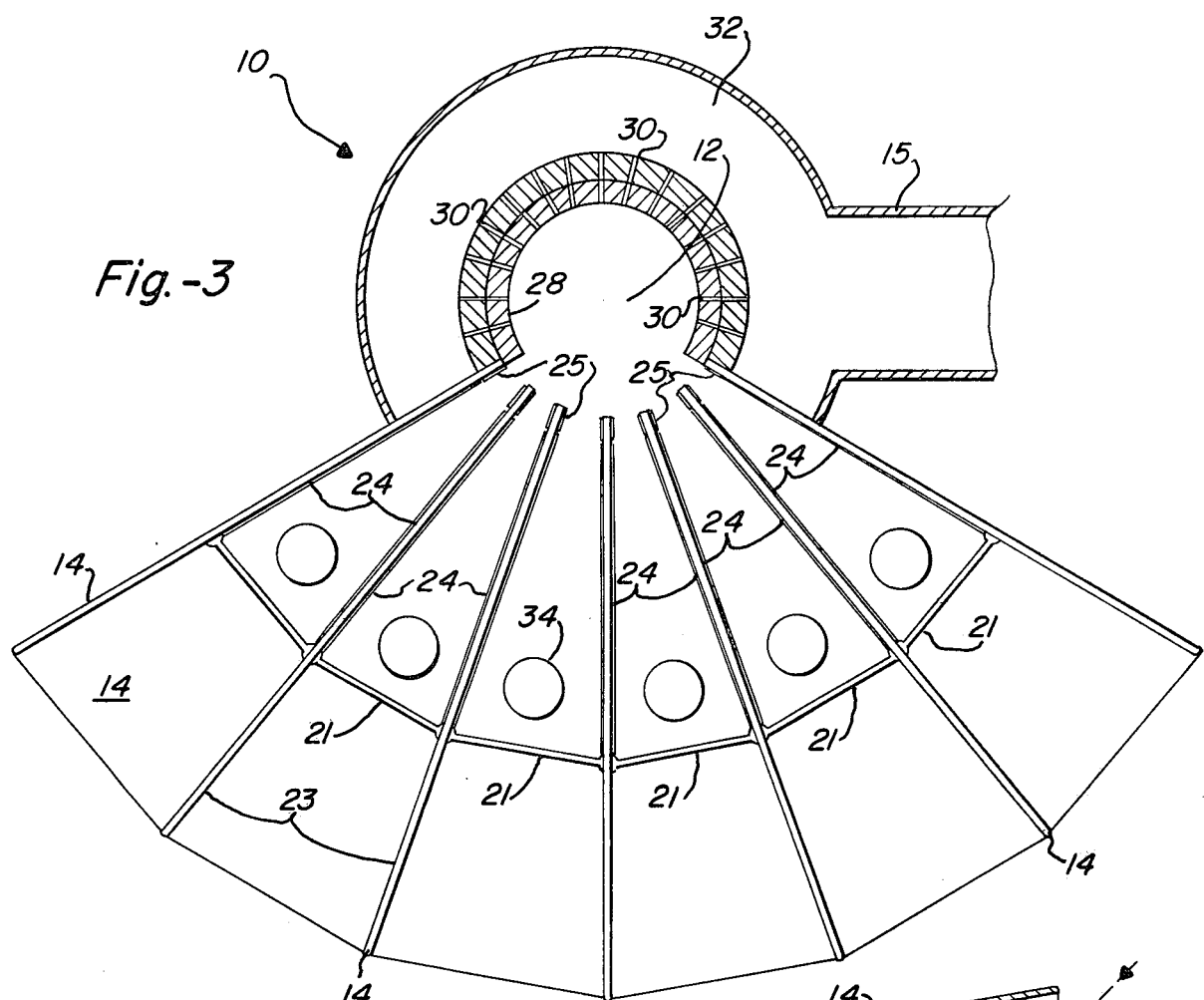
FIG. 3 is a top sectioned view of a solar receiver in accordance with the instant invention.

FIG. 3 particularly well describes the detailed structure and function of receiver 10. As shown, vanes 14 have a reflective surface 23 at the portion outward of transparent barrier 21. Immediately inward of transparent barrier 21, vanes 14 carry a selective surface 24. The innermost portions of vanes 14 may optionally have an absorbing surface 25 on limited portions of the innermost portions of vanes 14, or this portion may be of the selective surface 24. Absorbing surfaces 25 may be positioned to intercept rays which would be reflected at a large angle of incidence across cavity 12. The general functions of reflective surface 23 and absorbing surface 25 are well known. Essentially, reflecting surface 23 reflects most energy falling thereon. Absorbing surface 25 absorbs the energy falling thereon. Again, as is well known, reflecting surface 23 has a low emissivity while absorbing surface 25 has a high emissivity. On the other hand, selective surface 24 displays a high absorptivity for energy impinging thereon with a small angle of incidence, i.e., plus or minus 15°, a high reflectivity for energy impinging thereon with a relatively large angle of incidence and a low overall emissivity. Such surfaces are conventionally micro wavetraps such as an array of tungsten dendrities. Thus, the projecting surfaces absorb radiation traveling substantially parallel to the dendrites, but reflect energy traveling substantially transverse to the depth of the dendrities. Typical selective surfaces are discussed in the article at Page 5 of *The Colorado Engineer*, March, 1975; the May 15, 1976 volume of *Applied Physics Letters;* and IBM Research Report 4974 entitled "A New Concept for Solar Energy Thermal Conversion" published Apr. 6, 1974. While tungsten dendrities arrays are preferable as selective coatings for surfaces 24, other such materials of course are also functional. As will be described below with regard to a particularly preferred embodiment of the invention, other materials having a greater propensity to oxidize than the tungsten dendrities are workable in conjunction with the preferred embodiment of the invention.

Figure 4:
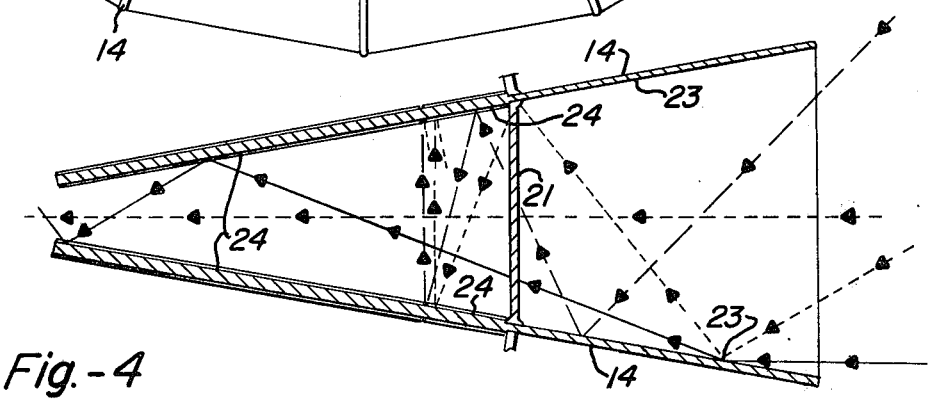
FIG. 4 is a sectioned view of the vanes of the solar receiver of FIG. 3 particularly illustrating typical ray paths into the solar receiver.

As illustrated in FIG. 4, it is an established geometrical precept that rays impinging upon converging surfaces such as vanes 14 tend to successively impinge at smaller angles of incidence until, unless the rays pass through the converging vanes, the rays ultimately reverse themselves and tend to reflect from the converging surfaces. Thus, rays initially striking reflective surfaces 23 at relatively small angles of incidence tend to be reflected at smaller angles of incidence until the rays reach selective surfaces 24. At selective surfaces 24 the rays striking at a small angle of incidence are absorbed to preclude reversing of the direction, while rays impinging at a large angle of incidence are reflected by selective surface 24. Deeper in the throat of vanes 14, rays striking absorbing surface 25 tend to be absorbed at such surface. However, a great percentage of the radiant energy reflected towards receiver 10 pass either directly or with reflection at a relatively large angle of incidence, through the throat of vanes 14 into cavity 12. Absorbing surfaces 25 are located to absorb rays which would be reflected across cavity 12 and out from receiver 10 between other vanes 14. Cavity 12 includes an absorbing surface 28 and a series of cooling channels 30. Accordingly, the radiant energy passing through the throats of vanes 14 into cavity 12 is absorbed at absorbing surface 28 or the inner surfaces of cooling channel 30. A cooling medium is flowed through channels 30 into volume 32 to permit the energy to be carried away through outlet 15. Preferably, the cooling medium also passes through inlets 34 into the volume defined by vanes 14 and transparent barrier 21. Thus, the cooling medium also cools surfaces of vanes 14, and particularly the surfaces including selective surfaces 24 and absorbing surfaces 25. If cavity 12 is omitted, this latter mechanism provides for cooling.

In a particularly preferred embodiment of the invention, the cooling medium is a medium absorbing infrared radiation but transmitting shorter wave lengths of the solar spectrum. Similarly, transparent barrier 21 is a material which transmits shorter wave lengths of the solar radiation, but blocks infrared radiation, i.e., the radiation emitted by the various surfaces after being heated by absorption of ultraviolet radiation. Carbon dioxide gas is particularly useful as a cooling medium in that it absorbs infrared radiation and thus blocks irradiation losses from cavity 12 and/or the walls of vane 14. Thus, carbon dioxide gas flowed through inlets 34, through cavity 12 and out through cooling channels 30 into volume 32 and outlet 15 would be heated to an elevated temperature, i.e., on the order of 500° C and may be thereafter employed as a working fluid in a power cycle, or as the hot side media in a heat exchange process. Also, since carbon dioxide is relatively inert, selective surfaces 24 which would oxidize in air at the operating temperature contemplated are protected. Other process streams can be flowed through receiver 10 in a similar manner.

Figure 5:
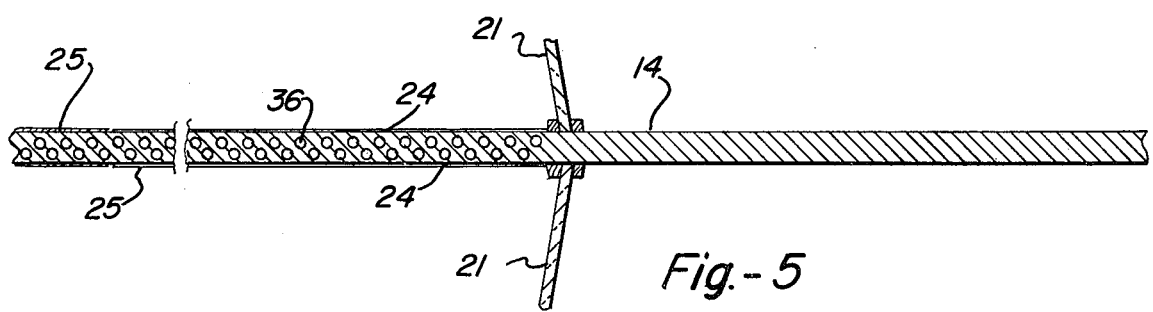
FIG. 5 is an enlarged sectioned view of a single vane of the solar receiver of FIG. 3.

As shown in FIG. 5, the portion of vane 14 having selective surfaces 24 and optional absorbing surfaces 25 include internal cooling passages 36 to carry away the substantial heat energy at vanes 14 resulting from absorption of solar energy at selective surfaces 24 and optional absorbing surfaces 25. Cooling passages 36 may contain the same cooling media as flows through cooling channels 30, or, alternatively, cooling passages 36 may include a cooling media such as sodium, water, air etc., which thereafter may be subject to a heat exchange process or used directly as a working fluid for a power cycle. While cooling passages 36 are illustrated as tubes adapted for pressurized working fluids, it is to be understood that vanes 14 could be spaced plates and a lower pressure cooling media flowed between the plates.

Thus, while receiver 10 is provided with a particularly large aperture for receiving energy from heliostats 19, many of the conventional losses resulting from such a large aperture are avoided. The outer surfaces 23 of vanes 14 are reflective and thus do not reach an elevated temperature or emit infrared energy. At the point where a substantial quantity of the rays initially striking vanes 14 at a relatively small angle of incidence tend to reverse direction and thus escape, selective surfaces 24 are provided to absorb such rays while reflecting rays intercepting vanes 14 at a larger angle of incidence. Further into the throat of vanes 14, optional absorbing surfaces 15 absorb substantially all of the energy impinging thereon. Although absorbing surfaces 25 have a high emissivity, such energy is emitted rather deep in the throat of vanes 14, and thus tends to be ultimately reabsorbed rather than lost through the aperture of vanes 14. Cooling channels 36 serve to carry away such energy and thus little energy is lost through irradiation.

In a particularly preferred embodiment of the invention, transparent barrier 21 is provided to permit a cooling media such as carbon dioxide to be flowed through the throat area of vanes 14, i.e., that bounded by selective surface 24 and/or absorbing surface 25. The carbon dioxide is transparent to ultraviolet light, thus permitting solar radiation to be transmitted therethrough and into cavity 12. However, carbon dioxide and other known fluids are substantially absorbing media for infrared radiation thus blocking the remission of energy. The infrared energy emitted by the throat area of vanes 14 and cavity 12 is absorbed by the carbon dioxide, the carbon dioxide is thus heated and thereafter utilized after being further heated by passing through channels 30, as a source of high temperature energy, or as a working fluid. Optionally, this permits the volume defined by vanes 14 to completely serve the function of cavity 12. Other process streams, i.e., steam reformation streams could similarly be flowed through receiver 10.

Summarily, though the critical use of selective surface 24 is the prime operative structure to permit a large aperture receiver with low losses to irradiation. The efficiency, i.e., energy received to energy lost ratio may be further enhanced by optionally utilizing as a heat conductive cooling media a fluid which is transparent to ultraviolet radiation and absorbs infrared radiation.

Although only limited embodiments of the present invention have been illustrated and described, it is anticipated that various changes and modifications will be apparent to those skilled in the art, and that such changes may be made without departing from the scope of the invention as defined by the following claims.

What is claimed is:

1. A radiant energy receiver comprising:
   a plurality of elongated vane structures arranged in a converging configuration from an exterior portion thereof to an interior throat portion thereof, the exterior to intermediate surfaces of the vanes being at least in part of a reflecting surface, and the intermediate to interior surfaces of the vanes being at least in part of a selective surface which absorbs radiant energy striking the selective surface at a small angle of incidence, but reflects such energy impinging at a greater angle of incidence, whereby radiant energy impinging upon the exterior portions of the vane is reflected towards the converging throat of the vanes and radiant energy in the interior portion striking the selective surface at a relatively small angle of incidence as would indicate incipient or actual reversal of direction of travel of the radiant energy relative to the vanes is absorbed while that striking the selective surface at a relatively large angle of incidence is reflected into the throat of the vanes to generate elevated temperature adjacent the throat of the vanes.

2. A radiant energy receiver as set forth in claim 1 in which the selective surface absorbs energy striking the selective surface at an angle of less than about 15°.

3. A radiant energy receiver as set forth in claim 1 in which the vanes at least in part circumferentially enclose the volume defined between adjacent vanes.

4. A radiant energy receiver as set forth in claim 3 in which the vanes fully circumferentially enclose the volume between adjacent vanes.

5. A radiant energy receiver as set forth in claim 1 in which at least a portion of the interior surface is of an absorbing surface.

6. A radiant energy receiver as set forth in claim 1 in which cooling passages are defined in the interior of the vanes adjacent the selective surface.

7. A radiant energy receiver as set forth in claim 1 in which a wall defining a cavity is provided, the cavity being positioned adjacent the interior throat portion of the vanes.

8. A radiant energy receiver as set forth in claim 7 in which cooling channels are defined through the wall defining the cavity.

9. A radiant energy receiver as set forth in claim 1 in which the vanes fully circumferentially enclose the volume defined therebetween and a barrier transparent to shorter wave lengths of the solar spectrum is positioned substantially transverse to the vanes at intermediate portions thereof to physically enclose the throat portions of the vanes.

10. A radiant energy receiver as set forth in claim 8 in which inlets are provided between the vanes at the area between the barrier and the throat portion of the vanes, whereby fluids may be flowed through the volume defined by the barrier and vanes and exposed to the elevated temperatures generated.

11. A radiant energy receiver as set forth in claim 10 in which a wall defining a cavity is positioned adjacent the throat of the vanes, and channels are defined through the cavity wall, whereby fluids flowing from the inlets may pass through the channels and from the receiver.

12. A radiant energy receiver as set forth in claim 1 in which the selective surface is comprised of tungsten dendrites.

13. A radiant energy receiver as set forth in claim 1 in which the selective surface is comprised of micro wavetraps in the form of numerous needles of material closely bunched with an average spacing between the needles of several wavelengths of the radiant energy.

14. A solar energy receiver adapted to efficiently intercept solar energy reflected from an array of heliostats towards the receiver, the receiver comprising:
   a plurality of converging vanes defining an exterior opening at one end of the vanes and the converging throat portion at the other end of the vanes, the exterior to intermediate side surfaces of the vanes having low emissivity reflective coatings thereon and the intermediate to interior surfaces of the vanes having, at least in part, low emissivity selective coatings adapted to absorb energy impinging upon the vanes at a small angle of incidence but reflect energy impinging upon the vanes at larger angles of incidence, and means to flow a fluid adjacent the throat portion of the vanes, whereby, the receiver will efficiently present a large target to intercept the energy reflected towards the receiver, lose little energy through irradiation or reversal of the direction of travel of the solar energy between the converging vanes, and flow a fluid through the portion of the receiver at an elevated temperature to be heated by the concentrated energy.

15. A solar energy receiver is set forth in claim 14 in which a cavity defined by a wall is positioned adjacent the throat portion of the vanes, and a substantially concentric enclosure is positioned exterior of the wall defining the cavity, with channels defined through the wall defining the cavity to permit fluid to flow from the cavity into the volume defined by the enclosure and the wall defining the cavity.

16. A method for absorbing radiant energy comprising:

intercepting the energy between converging vanes at the more widely spaced end of the vanes;

reflecting the energy received from low emissivity reflecting surfaces at the exterior to intermediate portions of the vanes;

impinging the energy at the intermediate to interior portions of the vanes upon a selective surface;

absorbing the energy impinging upon the selective surface at a small angle of incidence; and reflecting the energy impinging upon the selective surface at a greater angle of incidence, whereby, energy tending to reverse direction between the converging vanes is absorbed while that moving towards the throat of the vanes is reflected.

17. A method as set forth in claim 16 in which a gas which absorbs infrared radiation is flowed between at least a portion of the vanes from a more widely spaced portion of the vanes to a less widely spaced portion of the vanes, whereby, the gas will cool the vanes and absorb relatively long wave length energy being irradiated.

18. A method as set forth in claim 17 in which the gas is carbon dioxide.

* * * * *

UNITED STATES PATENT AND TRADEMARK OFFICE
CERTIFICATE OF CORRECTION

PATENT NO. : 4,047,517
DATED : September 13, 1977
INVENTOR(S) : B. Thomas Arnberg It is certified that error appears in the above-identified patent and that said Letters Patent are hereby corrected as shown below:

```
Column 2, line 1, "larger" should be "large"
Column 2, line 62, "is positioned" should be "is preferably
    positioned"
Column 3, line 38, "dendrities" should be "dendrites"
Column 3, line 41, "dendrities" should be "dendrites"
Column 3, line 47, "dendrities" should be "dendrites"
Column 3, line 52, "dendrities" should be "dendrites"
Column 5, line 4, "15" should be "25"
Column 5, line 20, "remission" should be "reemission"
```

Signed and Sealed this

Seventh Day of February 1978

[SEAL]

Attest:

RUTH C. MASON
*Attesting Officer*

LUTRELLE F. PARKER
*Acting Commissioner of Patents and Trademarks*